United States Patent
Van Phan et al.

(10) Patent No.: US 8,954,078 B2
(45) Date of Patent: Feb. 10, 2015

(54) HANDING OVER RELAYED CONNECTIONS IN MOBILE ENVIRONMENT

(75) Inventors: Vinh Van Phan, Oulu (FI); Ling Yu, Oulu (FI); Kari Veikko Horneman, Oulu (FI); Jaakko Eino Ilmari Vihriala, Oulu (FI); Matti Tapani Kiiski, Oulunsalo (FI); Olli Juhani Piirainen, Oulu (FI); Markku Juha Vainikka, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 375 days.

(21) Appl. No.: 13/512,995

(22) PCT Filed: Dec. 2, 2009

(86) PCT No.: PCT/EP2009/066195
§ 371 (c)(1),
(2), (4) Date: Aug. 16, 2012

(87) PCT Pub. No.: WO2011/066853
PCT Pub. Date: Jun. 9, 2011

(65) Prior Publication Data
US 2012/0315916 A1 Dec. 13, 2012

(51) Int. Cl.
*H04W 36/00* (2009.01)
*H04W 36/08* (2009.01)
*H04W 84/00* (2009.01)
*H04W 84/10* (2009.01)

(52) U.S. Cl.
CPC ............ *H04W 36/08* (2013.01); *H04W 84/005* (2013.01); *H04W 84/10* (2013.01)
USPC ........ 455/442; 455/562.1; 455/443; 370/335; 370/342

(58) Field of Classification Search
CPC ... H04W 36/08; H04W 84/005; H04W 84/10; H04W 36/00
USPC .............. 455/101, 61, 522, 501, 562.1, 13.4, 455/442, 443; 370/335, 342, 337, 330, 208, 370/318; 375/142, 130, 347, 346, 139
See application file for complete search history.

(56) References Cited

U.S. PATENT DOCUMENTS

| | | | |
|---|---|---|---|
| 8,200,239 B2* | 6/2012 | Mia et al. | 455/456.1 |
| 2002/0123365 A1* | 9/2002 | Thorson et al. | 455/524 |
| 2006/0030311 A1* | 2/2006 | Cruz et al. | 455/431 |
| 2009/0225743 A1* | 9/2009 | Nicholls et al. | 370/350 |
| 2010/0008290 A1* | 1/2010 | Fischer | 370/328 |
| 2010/0034151 A1* | 2/2010 | Alexiou et al. | 370/329 |

FOREIGN PATENT DOCUMENTS

EP 1 401 229 A1 3/2004
EP 1 786 217 A1 10/2006

OTHER PUBLICATIONS

Teyeb, O., et al., "Handover Framework for Relay Enhanced LTE Networks", © 2009 IEEE, 5 pgs.
Teyeb, O., et al., "Dynamic Relaying in 3GPP LTE-Advanced Networks", Hindawi Publishing Corp., EURASIP Journal on Wireless Communications and Networking, vol. 2009, Jan. 1, 2009, 11 pgs.

* cited by examiner

*Primary Examiner* — Mahendra Patel
(74) *Attorney, Agent, or Firm* — Harrington & Smith

(57) ABSTRACT

A method, apparatus, and computer program for continuing transmission during handover are presented. A communication connection is established between a source base station and a mobile relay base station comprising a distributed antenna system (DAS). The DAS includes multiple spatially distributed antenna units (DAUs), wherein at least part of the DAUs are used for forming a cluster of sub-cells within a coverage area of the mobile relay base station and at least part of the DAUs are used for communicating with a fixed cellular network infrastructure over multiple backhaul links. A first backhaul link is then handed over from the source base station to a target base station. After the handover, data transfer between the source base station and at least one backhaul link still linked to the source base station is continued, and remaining backhaul link(s) are released from the source base station according to a determined criterion.

25 Claims, 3 Drawing Sheets

HANDING OVER RELAYED CONNECTIONS IN MOBILE ENVIRONMENT

FIELD

The invention relates to the field of cellular radio telecommunications and, particularly, to relayed communications in a mobile environment.

BACKGROUND

With the ever increasing demand for increasing data rates and higher quality services in the world of mobile communications comes the ever increasing demand for better performance of cellular network infrastructures. People use their mobile equipment with support for high data rate services while they are at work, at home, and/or while traveling on a mass transportation vehicle, e.g. a bus, train, and ship. Such a mass transportation vehicle may travel at a speed of up to 100 m/s, and a huge number of communicating mobile devices on the vehicle traveling at the same speed sets high demands for network operators, because the users wish to preserve their high data rate connections regardless of the speed of the vehicle. Long-term evolution (LTE) of the $3^{rd}$ generation mobile communication system standardized within 3GPP ($3^{rd}$ Generation Partnership Project) has introduced a relayed extension in a cellular network infrastructure. Relaying links between user terminals and conventional base stations through relaying base stations improves capacity, coverage, and data rates. Relay base stations with multi-antenna arrays are also used to improve the performance of the cellular network. However, even the relayed extension as such may not be sufficient for meeting the demand of the customers.

BRIEF DESCRIPTION

According to an aspect of the present invention, there is provided a method comprising: causing establishment of a communication connection between a source base station of a fixed cellular network infrastructure and a mobile relay base station comprising a distributed antenna system comprising a plurality of spatially distributed antenna units, wherein at least part of the spatially distributed antenna units are used for forming a cluster of sub-cells within a coverage area of the mobile relay base station and at least part of the spatially distributed antenna units are used for communicating with the fixed cellular network infrastructure over a plurality of backhaul links; handing over a first backhul link from the source base station to a target base station of the fixed cellular network infrastructure; continuing data transfer between the source base station and at least one backhaul link still linked to the source base station after the handover of the first backhaul link; and causing release of remaining at least one backhaul link from the source base station according to a determined criterion.

According to another aspect of the present invention, there is provided an apparatus comprising: a communication control circuitry configured to cause establishment of a communication connection between a source base station of a fixed cellular network infrastructure and a mobile relay base station comprising a distributed antenna system comprising a plurality of spatially distributed antenna units, wherein at least part of the spatially distributed, antenna units are used for forming a cluster of sub-cells within a coverage area of the mobile relay base station and at least part of the spatially distributed antenna units are used for communicating with the fixed cellular network infrastructure over a plurality of backhaul links; to hand over a first backhaul link from the source base station to a target base station of the fixed cellular network infrastructure; to continue data transfer between the source base station and at least one backhaul link still linked to the source base station after the handover of the first backhaul link; and to cause release of remaining at least one backhaul link from the source base station according to a determined criterion.

According to another aspect of the present invention, there is provided an apparatus comprising: at least one processor; and at least one memory including a computer program code, wherein the at least one memory and the computer program code are configured to, with the at least one processor, cause the apparatus to: cause establishment of a communication connection between a source base station of a fixed cellular network infrastructure and a mobile relay base station comprising a distributed antenna system comprising a plurality of spatially distributed antenna units, wherein at least part of the spatially distributed antenna units are used for forming a cluster of sub-cells within a coverage area of the mobile relay base station and at least part of the spatially distributed antenna units are used for communicating with the fixed cellular network infrastructure over a plurality of backhaul links; hand over a first backhaul link from the source base station to a target base station of the fixed cellular network infrastructure; continue data transfer between the source base station and at least one backhaul link still linked to the source base station after the handover of the first backhaul link, and cause release of remaining at least one backhaul link from the source base station according to a determined criterion.

According to another aspect of the present invention, there is provided an apparatus comprising: means for establishing a communication connection between a source base station of a fixed cellular network infrastructure and a mobile relay base station comprising a distributed antenna system comprising a plurality of spatially distributed antenna units, wherein at least part of the spatially distributed antenna units are used for forming a cluster of sub-cells within a coverage area of the mobile relay base station and at least part of the spatially distributed antenna units are used for communicating with the fixed cellular network infrastructure over a plurality of backhaul links; means for handing over a first backhaul link from the source base station to a target base station of the fixed cellular network infrastructure; means for continuing data transfer between the source base station and at least one backhaul link still linked to the source base station after the handover of the first backhaul link; and means for causing release of remaining at least one backhaul link from the source base station according to a determined criterion.

According to yet another aspect of the present invention, there is provided a computer program product embodied on a computer readable distribution medium.

Embodiments of the invention are defined in the dependent claims.

LIST OF DRAWINGS

Embodiments of the present invention are described below, by way of example only, with reference to the accompanying drawings, in which FIG. 1 illustrates a communication environment to which embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
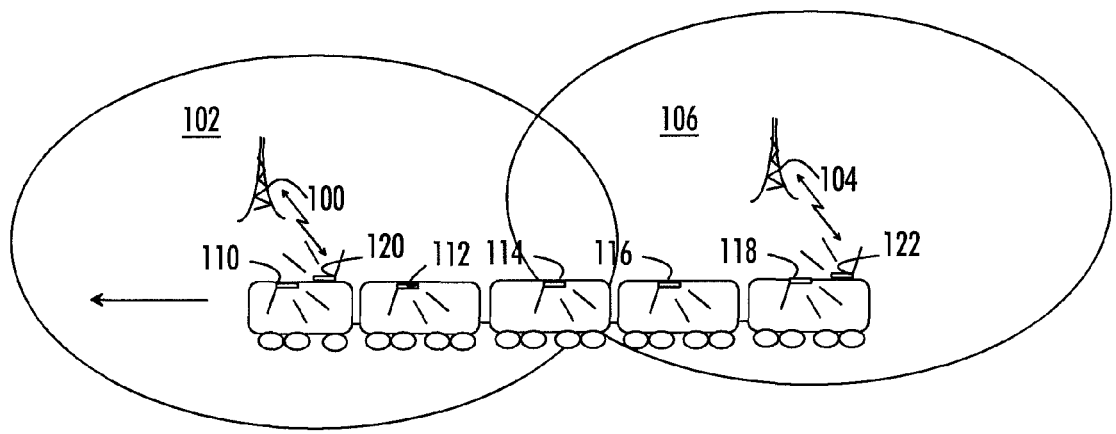

FIG. 1 illustrates an example of a communication environment between a mobile terminal and a mobile telecommunication system. In the illustrated scenario, the relay base station is a mobile (or nomadic) base station installed in a train (or another mobile vehicle) and configured to relay cellular communication links between a fixed cellular network infrastructure and user terminals residing on the train. The mobile telecommunication system may be any mobile telecommunication system, e.g. any one of the evolution versions of UMTS (Universal Mobile Telecommunication System), GSM (Global System for Mobile communications) or another second generation system, WiMAX (Worldwide Interoperability for Microwave Access), or any other mobile telecommunication system. However, application of the mobile relay terminals according to embodiments of the invention to the Long-term Evolution (Advanced), LTE(-A), of the UMTS may be regarded as one of preferred embodiments.

The relay base station employs a distributed antenna system (DAS) comprising a plurality of distributed antenna units (DAU) 110 to 122 distributed throughout the train. The DAS is a network of spatially separated antenna nodes connected to a common source via a transport medium that provides wireless services within a geographic area or structure. DAS antenna elevations are generally at or below the clutter level, e.g. inside buildings or other structures, and DAU installations are compact, because each DAU includes an antenna and a little amount of electronics so as to transfer signals between the antenna and the common source located physically apart from the DAU. Historically, the DAS has been evolved from an initial idea of splitting transmission power among several antenna elements, separated in space so as to provide coverage over the same area as a single antenna but with a reduced total power and improved reliability. This idea works because less power is wasted in overcoming structure penetration and shadowing losses. Additionally, as a line-of-sight channel is present more frequently, the DAS leads to reduced fading depths and a reduced delay spread. The DAS can be implemented using passive splitters and feeders, or active-repeater amplifiers can be used to overcome feeder losses. In systems where equalization is applied, it may be desirable to introduce delays between the antenna elements. This artificially increases the delay spread in areas where multiple DAUs have an overlapping coverage, permitting quality improvements via time diversity. In general, the DAS can be used to provide uniform signal quality over a targeted coverage area, to reduce zoning issues, to minimize proliferation of antenna sites, to increase spectrum efficiency, to reduce CAPEX and OPEX, and/or to ensure a future-proof radio access network.

It should be noted that the DAS differs from a conventional multi-antenna array in the physical spacing of the antenna elements. In the multi-antenna array, the antenna spacing is in the order of a wavelength, e.g. half the wavelength, while the antenna spacing of the DAS is considerably higher than that, e.g. in the order of meters or dozens of meters. One or more DAUs of the DAS may include a multi-antenna array so as to enable MIMO (multiple-input-multiple-output) communication techniques. The DAS may also employ cooperative MIMO communication where multiple DAUB are logically coupled to exploit better diversity, spatial multiplexing, and/or beamforming. The cooperative MIMO differs from the basic MIMO in that the antennas are distributed over a larger area in the cooperative MIMO.

Let us assume that the train in FIG. 1 has a length of 300 meters and ten train coaches. This train with a traveling speed varying from 10 m/s to 100 m/s may need about 3 seconds to 30 seconds to pass through a cell border. There may be a large number of users on board, even in the order of a thousand users. $1^{st}$ class cabins or coaches may have fewer users, whereas $2^{nd}$ class cabins may have a much higher user density. Hence, there are significant amounts of time and space provided to explore time-space diversities associated with such a moving relay system, together with user diversities resulted from service traffic demands and spatial distribution of mobile users on board. Providing a mobile relay base station on a train provides the user terminals in the train with a common access point, but the mobile relay base station with an antenna system at a single point in the train may not provide sufficient capacity. This motivates us to consider utilizing the DAS together with the mobile relay base station, e.g. by providing at least one DAU per a train coach (DAUs 110 to 118) for serving as individual sub-cell(s) inside the coverage area of the mobile relay base station. Additionally, at least two DAUs 120 and 122 may be placed outside the train to provide a communication link with the fixed cellular network infrastructure represented by fixed base stations 100, 104 associated with cells 102, 106, respectively. One of the DAUs 120, 122 may be placed at the head of the train and the other at the end of the train for sufficient mobile backhaul link(s), i.e. links with the fixed cellular network infrastructure. The long distance between the backhaul DAUs 120, 122 provides time-space diversity between the backhaul DAUs 120, 122. Naturally, the number of backhaul DAUs may be higher than two. Multiple logical backhaul links may be established in order to optimize backhaul link connection functionality, capacity and performance, high data-rate duplexing operation, connection control, and mobility management.

Due to the fact that the DAS is distributed over a relatively long distance, even in the order of one hundred meters or more, a conventional handover where the DAS is simply handed over from one base station to another does not provide an efficient performance. In such a case, the backhaul DAUs at the head of the train (or bus or the like) may benefit from the handover but the backhaul DAUs at the end of the train may still have a better channel with the source base station. Additionally, data has already been routed to the source base station for transmission to the mobile relay base station, and the handover results in transfer of such data from the source base station to the target base station, which results in additional traffic in an interface (X2 interface in the LTE) between the base stations.

Figure 2:
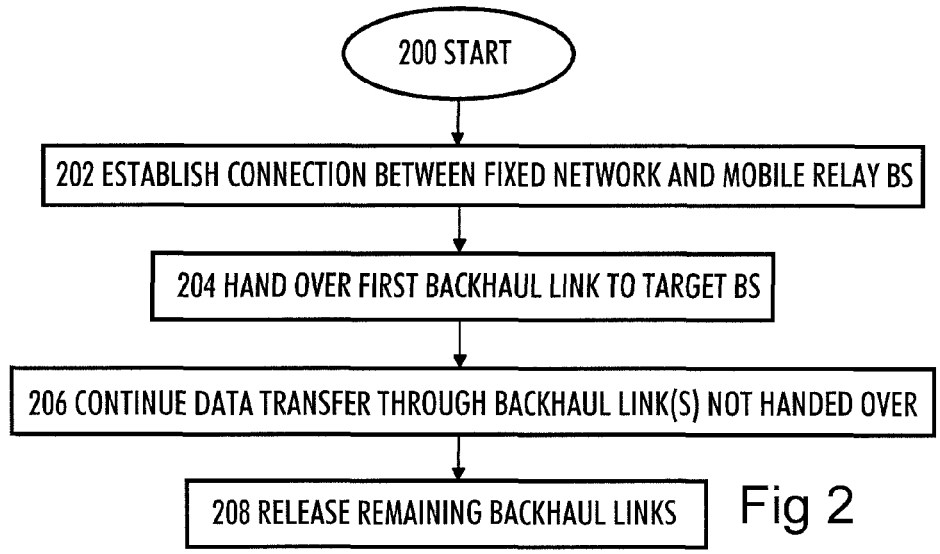
FIG. 2 is a flow diagram illustrating a process for carrying out communication in connection with a handover of a mobile relay base station according to an embodiment of the invention.

FIG. 2 illustrates a process for carrying out data transfer in connection with the handover of the DAS. The process is described on a general level, and the process may be carried out in a communication control circuitry applied to the mobile relay base station or to a network element of the fixed cellular network infrastructure, e.g. a fixed base station. The process starts in block 200.

In block 202, a communication connection is established between a source base station of a fixed cellular network infrastructure and a mobile relay base station comprising a DAS with a plurality of spatially distributed DAUs. At least some of the spatially distributed antenna units are used for forming a cluster of sub-cells within a coverage area of the mobile relay base station, and at least some of the spatially distributed antenna units are used for communicating with the fixed cellular network infrastructure over a plurality of backhaul links.

In block 204, a first backhaul link is handed over from the source base station to a target base station of the fixed cellular network infrastructure. The source base station may determine on the basis of a measurement report received from the mobile relay base station that the mobile relay base station needs to be handed over to a neighboring target base station and, as a consequence, it may prepare a handover by communicating with the target base station and then issue a handover command to the mobile relay base station triggering the handover of the first backhaul link. In block 204, more than one backhaul link may be handed over at the same time. Generally speaking, some of the backhaul links of the mobile relay base station are handed over in block 204 and the rest of the backhaul links remain connected to the source base station.

After the handover of the first (set) of backhaul links to the target base station, data transfer is continued between the source base station and at the least one backhaul link still linked to the source base station in block 206. The remaining at least one backhaul link is released from the source base station in block 208 according to a determined criterion.

Figure 3:
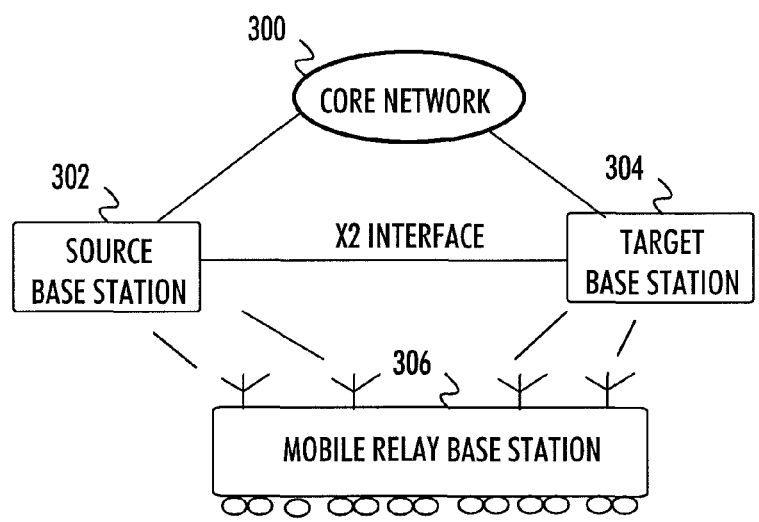
FIG. 3 illustrates another example of the communication environment to which embodiments of the invention may be applied.
Figure 4:
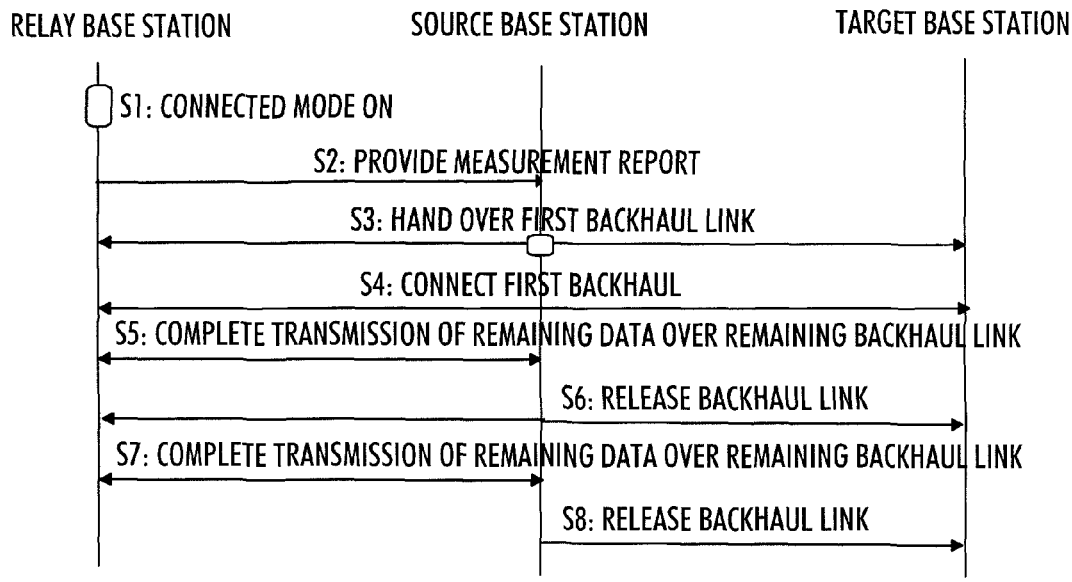
FIG. 4 is a signaling diagram illustrating data transfer in connection with a handover of a mobile relay base station according to an embodiment of the invention.
Figure 5:
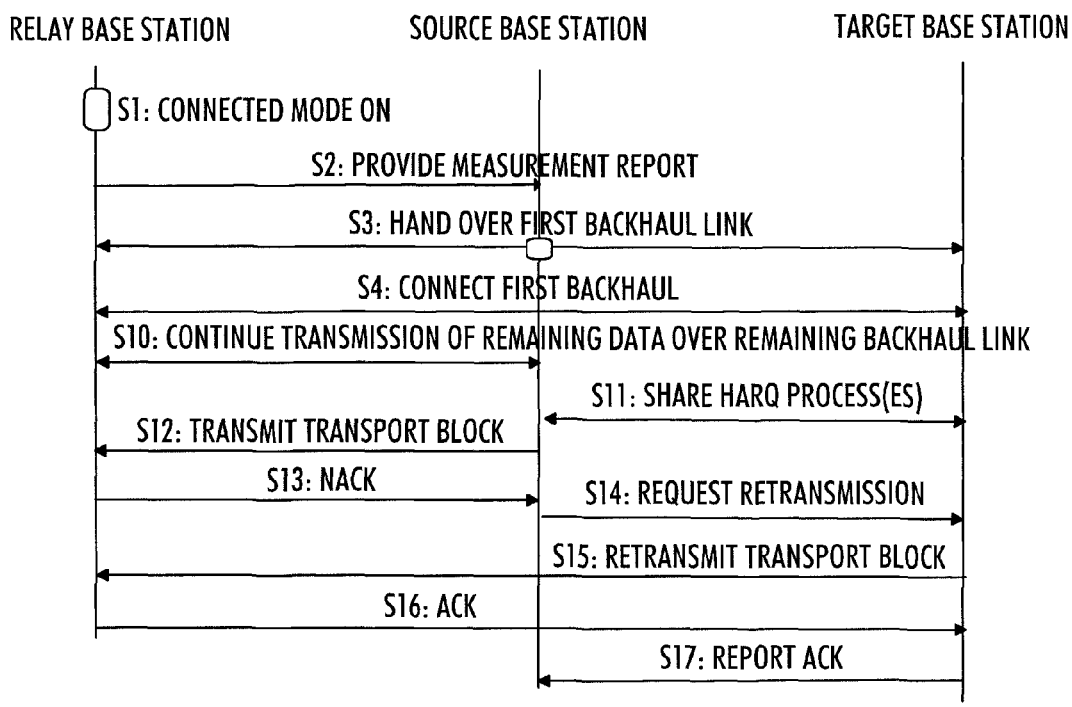
FIG. 5 is a signaling diagram illustrating sharing automatic repeat request processes in connection with a handover of a mobile relay base station according to an embodiment of the invention.

Let us consider different embodiments for carrying out blocks 206 and 208 with reference to FIGS. 3 to 5. FIG. 3 illustrates interfaces between different network elements, namely a core network 300, the source base station 302, the target base station 304, and the mobile relay base station. As illustrated in FIG. 3, the current scenario is such that some of the backhaul links of the mobile relay base station 306 have been handed over to the target base station 304 while the rest of the backhaul links are still connected to the source base station 302.

Before the handover, the core network 300 may have routed all the data destined to terminal devices served by the mobile relay base station through the source base station. As a consequence, buffers of the source base station may contain data to be transmitted to the mobile relay base station after the handover of the first (set) of backhaul links. In an embodiment, the data addressed to the mobile relay base station, routed to the source base station and contained in the buffers of the source base station may be transferred to the mobile relay base station through the remaining backhaul links. After the downlink data buffers of the source base station are empty of data destined to the mobile relay base station, the remaining backhaul links may be released. An advantage of this embodiment is that the transfer of the data routed to the source base station need not to be transferred to the target base station either through the X2 interface between the base stations 302, 304 or as a retransmission from the core network 300. This reduces unnecessary increase in traffic in the fixed radio access network.

After the handover of the first set of backhaul links, the mobile relay base station may have uplink data associated with the remaining backhaul links and contained in its uplink transmit buffers. In an embodiment, the remaining backhaul links are released after the uplink buffers associated with the remaining backhaul links are empty in the mobile relay base station. In an embodiment, the uplink buffers are radio link control (RLC) layer buffers. An advantage of this embodiment is that the mobile relay base station does not have to carry out re-segmentation of the uplink data that has already been segmented and stored in the buffers for transmission. In other words, data already processed for transmission over the remaining backhaul link may be transmitted before the release. After the uplink (RLC) data buffers of the remaining backhaul links are empty in the mobile relay base station, the mobile relay base station may send a control message to the source base station indicating that the buffers are empty and that the remaining backhaul links may be released.

In another embodiment, the source base station may release a remaining backhaul link after it has completed all the automatic repeat request (ARQ) processes for that backhaul link, including those of protocol layers below RLC referred to as hybrid ARQ (HARQ). After the handover of the first backhaul link, no new ARQ processes are established for the remaining backhaul links, i.e. no new data packets will be transferred but retransmissions of previously sent data packets may be carried out in the case of failure in reception of such data packets. As a summary of the above-described three embodiments, the remaining backhaul links are released after on-going transmissions associated with the source base station have been completed.

In an embodiment, the remaining backhaul links are released after the quality of the remaining backhaul links drops below a determined threshold level. The source base station and/or the mobile relay base station may monitor the quality of the backhaul links so as to determine whether or not to release the remaining backhaul links from the source base station. For example, the monitoring may include monitoring channel state indicators transferred between the mobile relay base station and the source base station, error rates (bit error, frame error, etc.), and/or other quality indicators.

In an embodiment, a timer counting a predetermined time period is started after the handover of the first backhaul link, and the remaining at least one backhaul link is released from the source base station after the expiry of the predetermined time period.

The above-described embodiments may naturally be combined. For example, the remaining backhaul links may be primarily released after both uplink buffers of the mobile relay base station and the downlink buffers of the source base station are empty. However, the release may be conducted earlier if the connection quality drops below the determined threshold level and/or if the timer expires. Alternatively, the system may utilize macro diversity (realized by the communication with two spatially separated base stations) for as long as possible. Then, the data transmission may be carried out for as long as the quality of the remaining backhaul links connected to the source base station drops below the determined threshold level. In such a case, even new data may be routed to the source base station after the handover of the first backhaul link.

It should be noted here that in an embodiment of the invention, the release of the remaining backhaul links is not carried out according to a normal handover procedure. The source base station may simply issue a release command so as to release each backhaul link without any handover commands being issued. In connection with the release command sent to the mobile relay base station, the source base station may send over the X2 interface a message to the target base station, wherein the message indicates an identifier of the released backhaul link and resources of the released backhaul link. As a consequence, the target base station knows about the released backhaul links and their resources so that it may configure the mobile relay base station to establish additional backhaul links with the target base station by utilizing the release resources and/or released DAUs. An advantage of releasing the remaining backhaul links instead of a conventional handover is that the mobile relay base station does not have to transmit measurement reports for the remaining backhaul links after the first (set of) backhaul link is handed over. Additionally, signaling overhead in general will be reduced which is a significant advantage in wireless communications. Furthermore, since the target base station may have to reconfigure the transferred backhaul links in any case according to the available resources in the target base station, for example, the overall procedure of releasing and adding backhaul links becomes less complex than a combined handover and a reconfiguration.

FIG. 4 is a signaling diagram illustrating communication in connection with a handover of a mobile relay base station utilizing a DAS. The mobile relay base station is in connected state in S1 and has established a plurality of backhaul links to the source base station. In S2, the mobile relay base station transmits a measurement report to the source base station. The measurement report may indicate channel states to a plurality of base stations around the mobile relay base station and with respect to the plurality of backhaul links.

In S3, the source base station determines that the mobile relay base station needs to be handed over to a target base station. As a consequence, the source base station initiates preparation of the handover of a first set of backhaul links (comprising at least one backhaul link, namely the first backhaul link) of the mobile relay base station. The first backhaul link may be associated with a DAU located at the head of the vehicle carrying the mobile relay base station, and the source base station may have that knowledge. As a consequence, the source base station knows to handover a determined number of backhaul link(s) starting from the head of the vehicle. The preparation of the handover may include transmitting a handover request to the target base station through the X2 interface. The handover request may include a mobile context of the mobile relay node, comprising relevant parameters of the mobile relay node, and identifiers of DAUs or backhaul links to be handed over. In response to the handover request, the target base station initiates preparation of the handover by storing the received mobile relay context and performing admission control for the backhaul link(s) to be handed over. Upon performing the admission control, the target base station transmits a handover response message to the source base station acknowledging readiness for the handover. Then, the source base station transmits a handover command to the mobile relay base station. The handover command includes identifiers of the target base station and the first set of backhaul links so that the mobile relay base station knows which backhaul link(s) is/are handed over to the target base station.

In S4, the mobile relay base station and the target base station communicate so as to connect the first set of backhaul links. Upon getting connected, the target base station transmits a handover complete message to the source base station through the X2 interface. Then, data is transferred between the mobile relay base station and the target base station over the backhaul links handed over. In S5, the source base station and the relay base station complete transmission of remaining data of a second backhaul link still connected to the source base station. The remaining data may include data already processed for transmission over the second backhaul link, as described above. Upon completion of the transmission of the remaining data, the second backhaul link is released in S6. The source base station may send a backhaul release message to the mobile relay base station so as to command the release. The source base station may also send a resource release indication message to the target base station to indicate the identifier of the released DAU or backhaul link and the resources just released so that the target base station may start to utilize and configure the released backhaul link and the allocation of the released resources. Similarly, the source base station and the relay base station complete transmission of remaining data of a third backhaul link still connected to the source base station in S7. Upon completion of the transmission of the remaining data, the third backhaul link is released in S8 in a manner similar to that in S6.

It should be noted that the remaining backhaul links may be released separately as their remaining transmissions become completed, or they may be released at the same time with a single release message transmitted to the mobile relay base station and a single resource release indication message transmitted to the target base station. In an embodiment, the release of the remaining backhaul links is indicated to the target base station with the resource release indication message conveyed through the X2 interface. In another embodiment, the mobile relay base station transmits a corresponding resource release indication message to the target base station in response to the reception of the release command from the source base station. In other words, the release of the remaining backhaul link(s) is routed from the source base station to the target base station over a radio interface through the mobile relay base station.

FIG. 5 illustrates another embodiment for transferring data through two base stations in connection with the handover of the mobile relay base station. Steps S1 to S4 are carried out in a manner similar to that in FIG. 4. In S10, transmission of data remaining in the source base station or in the mobile relay base station and processing for transmission over the remaining backhaul links are continued. At the same time data is transferred between the target base station and the mobile relay base station over those backhaul links that have already been handed over. In S11, the source base station and the target base station negotiate about a cooperative (hybrid) ARQ transmission procedure. The source base station and the target base station may share a common pool of ARQ processes and the (re)transmissions may be conducted with different base stations so as to provide macro diversity and improve a probability of successful transmission of data.

Let us consider an embodiment of a cooperative ARQ process. In S12, the source base station attempts to transmit a transport block (comprising data) to the relay base station. The relay base station fails to receive the transport block correctly and, as a consequence, sends a negative acknowledgment message (NACK) to the source base station in S13 (or sends nothing, which is interpreted in the source base station as NACK). Upon detection of erroneous reception of the transport block, the source base station sends a retransmission request message to the target base station through the X2 interface in S14. The retransmission request message may comprise an ARQ process identifier identifying the ARQ process, a retransmission transport block, and possible other information related to the ARQ process. The retransmission transport block may be the same transport block as that transmitted in S12, or it may comprise other incremental redundancy data, e.g. parity bits. The latter option is known from incremental redundancy of a hybrid automatic repeat request. In connection with S14, the source base station may optionally also inform the mobile relay base station that the retransmission will be transmitted by the target base station over a different backhaul link so that the mobile relay base station is able to extract the retransmission transport block from another backhaul link and (optionally) combine the original transmission and the retransmission transmitted through different backhaul links. However, according to the UMTS LTE, it is the target base station that indicates the transport block to the mobile relay base station in a control message before transmitting the actual transport block. In S15, the target base station transmits the retransmission transport block to the mobile relay base station. In S16, the mobile relay base station receives the retransmission transport block and is able to extract error-free data from the transport block(s) of the ARQ process in question. As a consequence, the mobile relay base station transmits an acknowledgment message (ACK) to the target base station in S16 to acknowledge the correct reception of the transport block. In S17, the target base station reports the completion of the ARQ process to the source base station.

The source and target base station may utilize the cooperative ARQ transmission in numerous ways. For example, every time a NACK is received the retransmission may be carried out by the other base station. Alternatively, one base station may attempt retransmission for a determined number of times before requesting the other base station to carry out the retransmission. In another embodiment, a base station detecting a high channel quality with the mobile relay base station may inform the other base station about the high channel quality. In response to such notification, the other base station may transfer responsibility of a number of on-going ARQ processes to the base station having the high channel quality. FIG. 5 illustrates cooperative ARQ transmission in downlink but, equally, the cooperative ARQ processes may be implemented for the uplink. The situation will then be reversed: the mobile relay base station transmits and the source/target base station receives. In the case of correct reception in one of the source and target base station, that base station may inform the other base station of the correct reception so that the other base station may close that ARQ process. The uplink implementation may include additional communication between the source and target base stations over the X2 interface with respect to a redundancy version applied to a given uplink transport block, but implementation of such additional communication is a matter of design.

Figure 6:
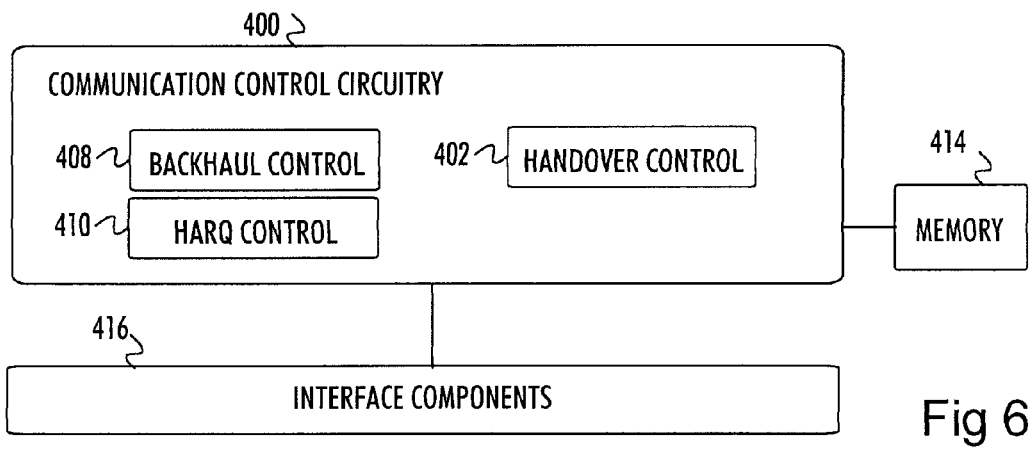
FIG. 6 illustrates an exemplary block diagram of an apparatus according to an embodiment of the invention.

FIG. 6 illustrates an exemplary block diagram of an apparatus according to an embodiment of the invention. The apparatus may be applied to a network element of the fixed cellular network infrastructure according to an embodiment of the invention. The network element may be the base station of the fixed cellular network. The network element comprises interface components 416 enabling establishment of a communication connection with mobile relay base stations operating in the coverage area of the fixed cellular network. The interface components may also implement a wired (or wireless) connection to the other base stations of the fixed cellular network infrastructure. If the cellular network operates according to the UMTS LTE, the interface components implement the X2 interface.

The network element further comprises a communication control circuitry 400 controlling the backhaul links established with the mobile relay base stations. The communication control circuitry 400 may include several subcircuitries controlling different parameters and operation of the backhaul links. A handover control circuitry 402 may analyze measurements reports received from the mobile relay base stations and control handovers of the mobile relay base stations. The handover control circuitry 402 may also control handovers of user terminals. A backhaul control circuitry 408 may control the number of backhaul links for each mobile relay base station, and other parameters of the backhaul links. The backhaul control circuitry may, for example, control the release of the remaining backhaul links in connection with the handover procedure, as described above. A HARQ control circuitry 410 controls HARQ processes carried out in the network element. The HARQ control circuitry 410 may be configured for cooperative HARQ processing in a manner described above.

The control circuitries 402, 408, and 410 may be implemented as logically and/or physically separate devices or entities. Some of the control circuitries may be included in the base station, while other control circuitries may be included in other parts of the network. Therefore, it should be understood that the present invention is not limited to a physical network element comprising all the control circuitries of FIG. 6. One or more circuitries may, however, be implemented by the same physical processor but as different logical operations defined by different computer program modules, for example.

The network element further comprises a memory unit 414 storing computer programs executed in the control circuitries 400 to 410. Additionally, the memory unit 414 may store parameters and information elements relevant to the mobile relay backhaul contexts and their configuration. The memory unit 414 may include data buffers for data to be transmitted from the network element, channel quality information for a radio channel between the network element and the mobile relay base station, and other information relevant to the communication in connection with the handover, as described above. The memory unit 414 may also store several other types of information necessary for the operation of the network element.

Figure 7:
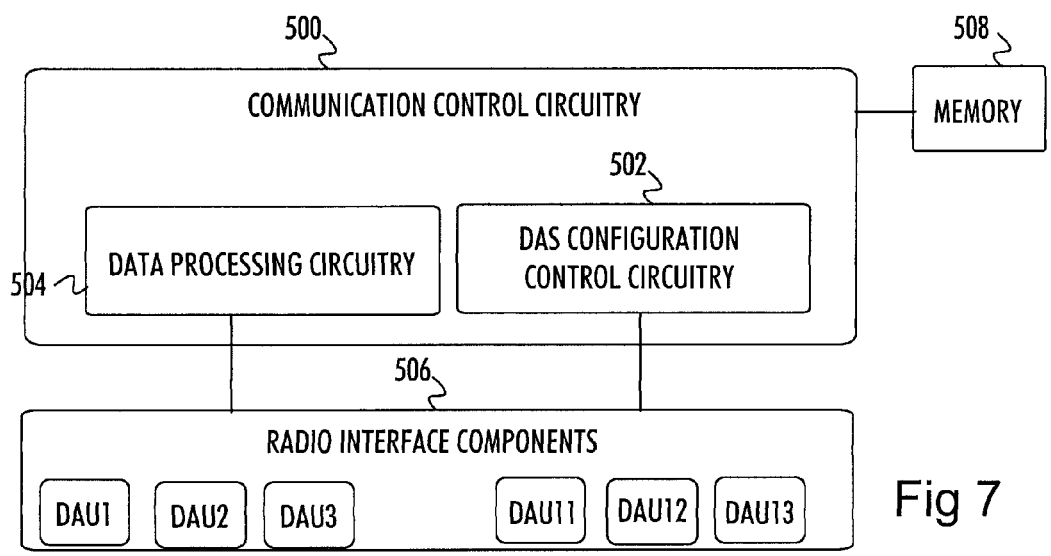
FIG. 7 illustrates an exemplary block diagram of another apparatus according to an embodiment of the invention.

FIG. 7 illustrates an exemplary block diagram of another apparatus according to an embodiment of the invention. The apparatus may be applied to a mobile relay base station according to an embodiment of the invention. The mobile relay base station may include radio interface components 506 enabling establishment of radio connections with user terminals in a coverage area of the mobile relay base station and one or more backhaul radio links with fixed base stations having the mobile relay base station residing in their coverage area. The radio interface components 506 comprise a DAS comprising a plurality of DAUs. Some of the DAUs may be dedicated to communicate with user terminals while some of the DAUs may be dedicated to communicate with the fixed cellular network over the backhaul links. However, at least some of the DAUs may be configured to communicate with both user terminals and the fixed cellular network. If the radiation pattern of a given DAU is configured to enable a sufficient coverage area in a sub-cell associated with the DAU and a connection with a serving fixed base station, the DAU may be configured to employ both types of links.

The mobile relay base station further comprises a communication control circuitry 500 configured to control the radio links established by the mobile relay base station. The communication control circuitry 500 may communicate with the fixed cellular network in order to create and operate the mobile relay backhaul links, as described above. The communication control circuitry 500 may comprise a data processing circuitry 504 configured to convey data packets of user terminals between the backhaul links and user terminal interface connections.

The communication control circuitry may also comprise a DAS configuration control circuitry 502 configured to control the configuration of the DAS and individual DAUs directly. The DAS configuration control circuitry 502 may operate under the control of the communication control circuitry 500 by adapting the configuration of the DAS according to control information received from the communication control circuitry 500. With respect to the backhaul DAUs, the DAS configuration circuitry 502 may control the number of active backhaul DAUs, the assignment of backhaul DAUs to logical backhaul links (as defined in the received control messages), and transmission/reception of data and control signals through different DAUs as scheduled by the fixed base station. The DAS configuration control circuitry may additionally control handover, adding and releasing the backhaul links in response to control messages received from the fixed cellular network. The DAS configuration control circuitry may command the data processing circuitry to stop processing new data to those backhaul links that are still connected to the source base station while some of the backhaul links have already been handed over. The configuration control circuitry may command the data processing circuitry to add/extract transmissions and retransmissions to/from appropriate backhaul links if they are transmitted as retransmissions of a given ARQ process and are transmitted over different backhaul links than the initial transmission. The DAS configuration control circuitry may also carry out other control operations related to the utilization of the backhaul links and described above.

The mobile relay base station further comprises a memory unit 508 storing computer programs executed in the communication control circuitry 500. Additionally, the memory unit 508 may store parameters and information elements relevant to the mobile relay backhaul links and their configuration. The memory unit 508 may also store several other types of information necessary for the operation of the mobile relay base station.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory (or memories) that work together to cause an apparatus to perform various functions, and (c) circuits, such as a microprocessor(s) or a portion of a microprocessor(s), that require software or firmware for operation, even if the software or firmware is not physically present. This definition of "circuitry" applies to all uses of this term in this application. As a further example, as used in this application, the term "circuitry" would also cover an implementation of merely a processor (or multiple processors) or a portion of a processor and its (or their) accompanying software and/or firmware.

The processes or methods described in connection with FIGS. 2 to 5 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable not only to the cellular or mobile telecommunication systems defined above but also to other suitable telecommunication systems. The cellular telecommunication system may have a fixed infrastructure providing wireless services to user terminals. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
causing establishment of a communication connection between a source base station of a fixed cellular network infrastructure and a mobile relay base station comprising a distributed antenna system comprising a plurality of spatially distributed antenna units, wherein at least part of the spatially distributed antenna units are used for forming a cluster of sub-cells within a coverage area of the mobile relay base station and at least part of the spatially distributed antenna units are used for communicating with the fixed cellular network infrastructure over a plurality of backhaul links;
handing over a first backhaul link from the source base station to a target base station of the fixed cellular network infrastructure;
continuing data transfer between the source base station and at least one backhaul link still linked to the source base station after the handover of the first back-haul link; and
monitoring and causing release of remaining at least one backhaul link from the source base station according to a criterion, where the criterion comprises one of all downlink data routed to the source base station has been transmitted to the mobile relay base station, uplink data buffers of the remaining at least one backhaul link in the mobile relay base station contain no uplink data, quality of the at least one backhaul link drops below a determined threshold level, or expiry of a predetermined time period after the handover of the first backhaul link.

2. The method of claim 1, wherein the release of the remaining backhaul links is carried out without a specific handover command.

3. The method of claim 1, further comprising: communicating information on the release of the remaining backhaul links between the source base station and the target base station, wherein the information comprises at least one of the following: an identifier of at least one released backhaul link, communication resources associated with the at least one released backhaul link, an identifier of at least one distributed antenna unit associated with the released backhaul link.

4. The method of claim 1, further comprising releasing the remaining at least one backhaul link from the source base station after all downlink data routed to the source base station has been transmitted to the mobile relay base station.

5. The method of claim 1, further comprising releasing the remaining at least one backhaul link from the source base station after uplink data buffers of the remaining at least one backhaul link in the mobile relay base station contain no uplink data.

6. The method of claim 1, further comprising:
monitoring quality of the remaining at least one backhaul link; and
releasing the remaining at least one backhaul link from the source base station when the quality of the at least one backhaul link drops below a determined threshold level.

7. The method of claim 1, further comprising: routing an indication of the release of a given remaining backhaul link from the source base station to the target base station through the mobile relay base station.

8. The method of claim 1, further comprising:
starting a timer counting a predetermined time period after the handover of the first backhaul link; and
releasing the remaining at least one backhaul link from the source base station after expiry of the predetermined time period.

9. The method of claim 1, further comprising: utilizing a cooperative automatic repeat request between the source base station and the target base station by transmitting an initial transmission of a data packet through a backhaul link associated with one of the source and target base station and at least one retransmission of the data packet through another backhaul link associated with the other of the source and target base station.

10. The method of claim 9, further comprising communicating information related to the automatic repeat request transmissions between the source base station and the target base station.

11. The method of claim 9, further comprising:
sending from one of the source base station and target base station to the other one a control message indicating a favorable condition to communicate with the mobile relay base station; and
transferring responsibility for at least one automatic repeat request process to the base station having the favorable condition in response to the control message.

12. An apparatus comprising:
a communication control circuitry configured to cause establishment of a communication connection between a source base station of a fixed cellular network infrastructure and a mobile relay base station comprising a distributed antenna system comprising a plurality of spatially distributed antenna units, wherein at least part of the spatially distributed antenna units are used for forming a cluster of sub-cells within a coverage area of the mobile relay base station and at least part of the spatially distributed antenna units are used for communicating with the fixed cellular network infrastructure over a plurality of backhaul links;
to hand over a first backhaul link from the source base station to a target base station of the fixed cellular network infrastructure;
to continue data transfer between the source base station and at least one backhaul link still linked to the source base station after the handover of the first backhaul link; and
to monitor and cause release of remaining at least one backhaul link from the source base station according to a criterion, where the criterion comprises one of all downlink data routed to the source base station has been transmitted to the mobile relay base station, uplink data buffers of the remaining at least one backhaul link in the mobile relay base station contain no uplink data, quality of the at least one backhaul link drops below a determined threshold level, or expiry of a predetermined time period after the handover of the first backhaul link.

13. The apparatus of claim 12, wherein the communication control circuitry is configured to release the remaining backhaul links without a specific handover command.

14. The apparatus of claim 12, wherein the communication control circuitry is configured to cause communication of information on the release of the remaining backhaul links between the source base station and the target base station, wherein the information comprises at least one of the following: an identifier of at least one released backhaul link, communication resources associated with the at least one released backhaul link, an identifier of at least one distributed antenna unit associated with the released backhaul link.

15. The apparatus of claim 12, wherein the communication control circuitry is configured to release the remaining at least one backhaul link from the source base station after all downlink data routed to the source base station has been transmitted to the mobile relay base station.

16. The apparatus of claim 12, wherein the communication control circuitry is configured to release the remaining at least one backhaul link from the source base station after uplink data buffers of the remaining at least one backhaul link in the mobile relay base station contain no uplink data.

17. The apparatus of claim 12, wherein the communication control circuitry is configured to monitor quality of the remaining at least one backhaul link and to release the remaining at least one backhaul link from the source base station when the quality of the at least one backhaul link drops below a determined threshold level.

18. The apparatus of claim 12, wherein the communication control circuitry is configured to cause routing of an indication of the release of a given remaining backhaul link from the source base station to the target base station through the mobile relay base station.

19. The apparatus of claim 12, wherein the communication control circuitry is configured to start a timer counting a predetermined time period after the handover of the first backhaul link, and to release the remaining at least one backhaul link from the source base station after expiry of the predetermined time period.

20. The apparatus of claim 12, wherein the communication control circuitry is configured to cause utilization of a cooperative automatic repeat request between the source base station and the target base station by transmitting an initial transmission of a data packet through a backhaul link associated with one of the source and target base station and at least one retransmission of the data packet through another backhaul link associated with the other of the source and target base station.

21. The apparatus of claim 20, wherein the communication control circuitry is configured to cause communication of information related to the automatic repeat request transmissions between the source base station and the target base station.

22. The apparatus of claim 20, wherein the communication control circuitry is configured to communicate a control message indicating favorable condition to communicate with the mobile relay base station, and to transfer responsibility for at least one automatic repeat request process between two base stations of the fixed cellular network infrastructure in response to the control message.

23. The apparatus of claim 12, wherein the apparatus is a base station of the fixed cellular network infrastructure.

24. An apparatus comprising:

at least one processor; and at least one memory including a computer program code, wherein the at least one memory and the computer program code are configured to, with the at least one processor, cause the apparatus to:

cause establishment of a communication connection between a source base station of a fixed cellular network infrastructure and a mobile relay base station comprising a distributed antenna system comprising a plurality of spatially distributed antenna units, wherein at least part of the spatially distributed antenna units are used for forming a cluster of sub-cells within a coverage area of the mobile relay base station and at least part of the spatially distributed antenna units are used for communicating with the fixed cellular network infrastructure over a plurality of backhaul links;

hand over a first backhaul link from the source base station to a target base station of the fixed cellular network infrastructure;

continue data transfer between the source base station and at least one backhaul link still linked to the source base station after the handover of the first backhaul link; and monitor and cause release of remaining at least one backhaul link from the source base station according to a criterion, where the criterion comprises one of all downlink data routed to the source base station has been transmitted to the mobile relay base station, uplink data buffers of the remaining at least one backhaul link in the mobile relay base station contain no uplink data, quality of the at least one backhaul link drops below a determined threshold level, or expiry of a predetermined time period after the handover of the first backhaul link.

25. A computer program product embodied on a non-transitory distribution medium readable by a computer and comprising program instructions which, when loaded into an apparatus, execute the method according to claim 1.

* * * * *